Patented June 23, 1931

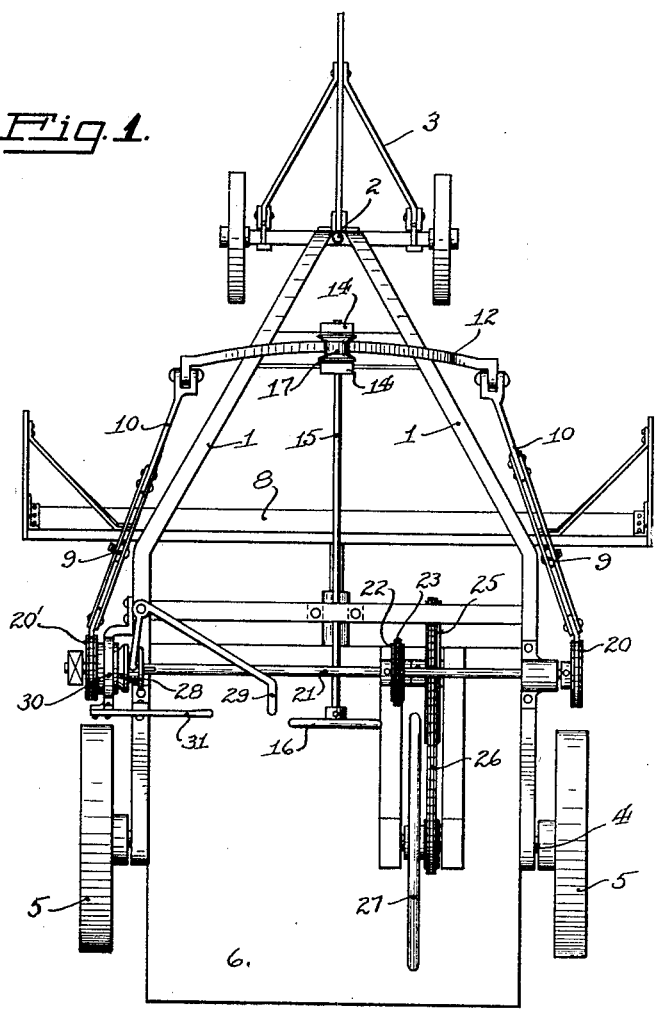

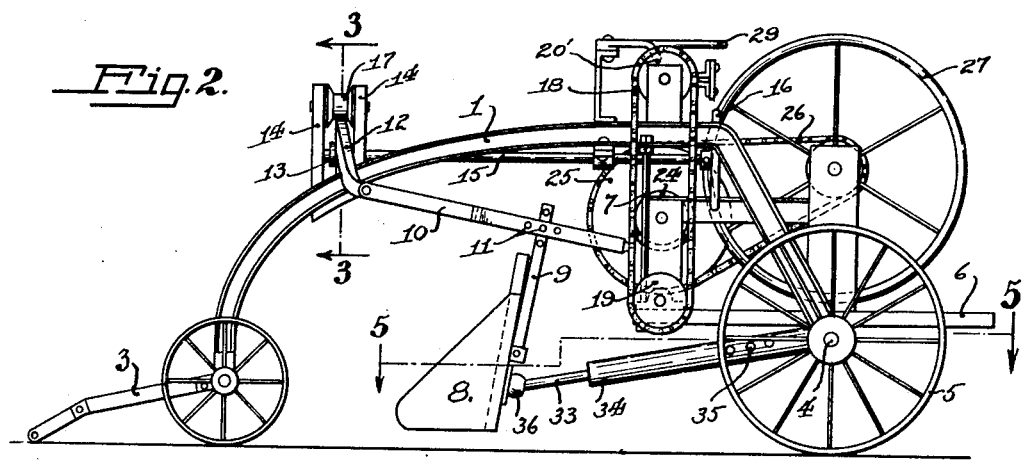
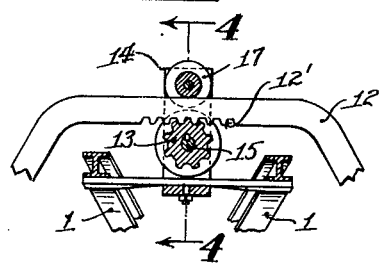
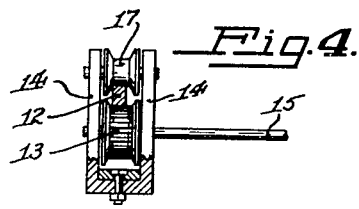
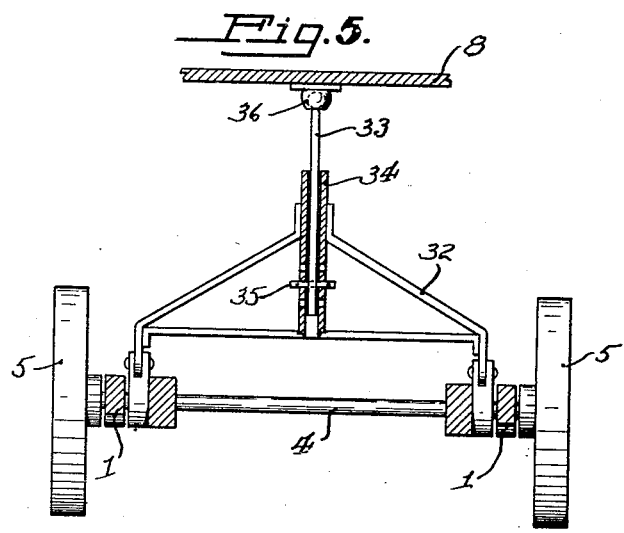

1,811,490

UNITED STATES PATENT OFFICE

EDGAR P. BROWN, OF WATSONVILLE, CALIFORNIA

LAND GRADER

Application filed February 7, 1930. Serial No. 426,540.

The present invention relates to adjustable land graders or scrapers.

The principal object of the invention is to provide a grader having a wheel supported frame in which the scraping blade is readily adjustable in a number of different directions, whereby the action of the machine can be easily and quickly controlled by an operator riding upon it.

Other objects and advantages of the invention will become apparent from the following specification which should be read with the understanding that the form, construction and arrangement of the several parts may be varied within the scope of the claims hereto appended without departing from the spirit of the invention as expressed in said claims.

A preferred embodiment of the invention will now be described fully with reference to the accompanying drawings wherein:—

Fig. 1 is a plan view of the machine.

Fig. 2 is a side elevation thereof.

Fig. 3 is a sectional detail taken on the line 3—3 of Fig. 2.

Fig. 4 is a sectional detail taken on the line 4—4 of Fig. 3.

Fig. 5 is a horizontal section taken approximately on the line 5—5 of Fig. 2.

In the drawings, the reference numeral 1 designates a main frame comprising two longitudinal members whose forward ends converge and slope downwardly to a kingpin 2 by which they are connected with a two wheeled draft truck 3. The rear portions of the frame members 1 are substantially parallel and incline downwardly to suitable bearings upon a rear axle 4, which is mounted upon supporting wheels 5. At the rear of the machine is a platform 6, upon which the operator stands, and which is supported from the rear axle 4 and by depending rods 7 from the frame members 1.

The scraper blade 8, which is of usual form, is suspended by substantially vertical links 9, whose upper ends are adjustably secured to substantially horizontal members 10. The members 10 are preferably formed of two spaced bars, as shown in Fig. 1, between which the ends of the vertical blade suspending members 9 lie, and a series of holes 11 are provided in the members 9 and 10, as shown in Fig. 2, by which said members may be bolted together in a variety of positions.

The forward ends of the members 10 are pivotally connected with a transverse arched bar 12 extending across over the frame members 1, the bars 10 and 12 thus forming an auxiliary frame from which the blade is adjustably suspended. The central portion of the bar 12 has teeth 12' on its lower surface, and rests upon a flanged gear 13, Figs. 3 and 4, suitably carried in bearing supports 14 secured to the main frame. A shaft 15 extends from the gear 13 rearwardly to a hand wheel 16, Fig. 1, within easy reach of the operator, so that by turning said wheel the forward portion of the blade carrying auxiliary frame is shifted laterally. A flanged guide roller 17 retains the bar 12 in contact with the teeth of the gear 13. The flanges of said gear and guide roller are preferably tapered to permit the bar 12 to have some rocking motion in a horizontal plane. The rear ends of the auxiliary frame members 10 are secured to endless flexible members, preferably chains 18, Fig. 2, which are carried upon vertically aligned sprockets at the sides of the machine. The lower sprockets 19 are merely idlers, and are suitably mounted upon the platform 6. The upper sprockets 20 and 20' are mounted upon a transverse shaft 21, Fig. 1, and in the central region of this shaft is a sprocket 22 connected by a downwardly extending chain 23 with a sprocket 24, Fig. 2. The latter sprocket is connected with a coaxial sprocket 25 of larger diameter, which is connected by a rearwardly extending chain 26 with a smaller sprocket secured to the hub of a hand wheel 27. Thus by turning the wheel 27, the rear ends of the members 10 carrying the blade 8 are raised or lowered.

The sprocket 20 shown at the right in Fig. 1 is permanently secured upon the transverse shaft 21, but the left hand sprocket 20' is adapted to be either secured to said shaft or released therefrom and held stationary at will. For this purpose I have indicated a clutch at 28 in Fig. 1, operated by a lever 29, by which the sprocket 20′ is either connected with or freed from the shaft 21. I have also indicated a brake 30 surrounding the hub of the sprocket 20′ and operated in any well known manner by a lever 31 by which said sprocket 20′ may be held stationary when released from the shaft 21. Thus if it be desired to raise or lower one side of the blade 8 more than the other side, the operator releases the sprocket 20′ from the shaft 21 and holds it stationary, while he turns the opposite sprocket 20 by means of the hand wheel 27 until the desired tilt of the blade is obtained. He then connects the sprocket 20′ again with the shaft 21 and releases the brake 30, whereupon the entire blade can be raised or lowered by the hand wheel 27 without changing its lateral tilt.

The rearward thrust of the blade 8 is resisted by a yoke member 32, Fig. 5, extending forwardly from the rear axle 4. A thrust rod 33 is adjustably secured within a sleeve 34 carried by the yoke 32 preferably by means of a removable pin or bolt 35, and the forward end of said rod 33 is connected by a ball and socket joint 36 with the rear of the blade 8. The yoke 32 and rod 33 also resist the side thrust of the blade, preventing it from shifting laterally of the frame 1.

In the operation of the machine, the blade is set in approximately the position desired by securing the members 9 and 10 together in the proper positions. Then, while the machine is in motion, the blade can be raised and lowered, or tilted to raise or lower one side more than the other, by means of the hand wheel 27 and the clutch and brake controlled by the levers 29 and 31. The blade may also be given a slight horizontal inclination, that is to advance one side ahead of the other side, by shifting the bar 12 laterally by means of the hand wheel 16. These adjusting movements require comparatively little effort because the thrust of the blade is taken by the rod 33 and yoke 32.

I claim:—

1. A land grader comprising a frame; a pair of sprockets mounted thereon; an endless flexible member extending between said sprockets; a bar having one end movably connected with said frame and the other end connected with said endless member; a blade carried by said bar; means for shifting the frame connected end of said bar transversely; and means for rotating said sprockets to raise and lower the other end of said bar.

2. A land grader comprising a main frame; an auxiliary frame carried thereby; a blade adjustably suspended from said auxiliary frame; a thrust member extending between said blade and the main frame; means for raising and lowering one end of the auxiliary frame; and means for transversely shifting the other end of said auxiliary frame.

3. A land grader comprising a main frame; a transversely disposed shaft mounted thereon; a pair of sprockets carried by said shaft; endless flexible members extending over said sprockets; means for separably connecting one of said sprockets with said shaft; means for holding the last mentioned sprocket stationary; a pair of bars having their forward ends movably connected with said frame and their rear ends connected with said endless members; a blade carried by said bars; and means for rotating said shaft to raise and lower the rear ends of said bars.

4. A land grader comprising a main frame; a longitudinally disposed rotatable shaft carried thereby; a gear secured upon said shaft; a transversely disposed member having teeth engaging said gear; a pair of bars extending rearwardly from the ends of said transverse member, said bars and said member forming an auxiliary frame; a blade carried by said auxiliary frame; means for rotating said shaft to shift the forward end of said auxiliary frame transversely; and means for raising and lowering the rear end of said auxiliary frame.

5. A land grader comprising a frame; a blade movably carried thereby; a horizontal shaft rotatably mounted upon said frame; a hand wheel connected with said shaft; a pair of endless flexible members running over and operated by said shaft, one run of each member being connected with one end of said blade; and means for separably connecting one of said members with said shaft.

In testimony whereof I have signed my name to this specification.

EDGAR P. BROWN.